(No Model.)

A. FOWKES & T. CONNOLLY.
SINGLE PIECE PORCELAIN WASHOUT WATER CLOSET.

No. 330,574. Patented Nov. 17, 1885.

Witnesses.
H. W. Elmore
Fred V. Fisher

By their Attorney.
F. C. Lowthorp

Inventors.
Alfred Fowkes.
Thomas Connolly.

United States Patent Office.

ALFRED FOWKES, OF PHILADELPHIA, PENNSYLVANIA, AND THOMAS CONNOLLY, OF TRENTON, NEW JERSEY.

SINGLE-PIECE PORCELAIN WASHOUT WATER-CLOSET.

SPECIFICATION forming part of Letters Patent No. 330,574, dated November 17, 1885.

Application filed August 10, 1885. Serial No. 173,914. (No model.)

*To all whom it may concern:*

Be it known that we, ALFRED FOWKES, a citizen of the United States, residing at Philadelphia, in the State of Pennsylvania, and THOMAS CONNOLLY, a subject of the Queen of Great Britain, residing in Trenton, county of Mercer, and State of New Jersey, have jointly invented a new and useful Improvement in One-Piece Porcelain Washout Water-Closets, of which the following is a specification, reference being had to the accompanying drawings, in which—

Figure 1:
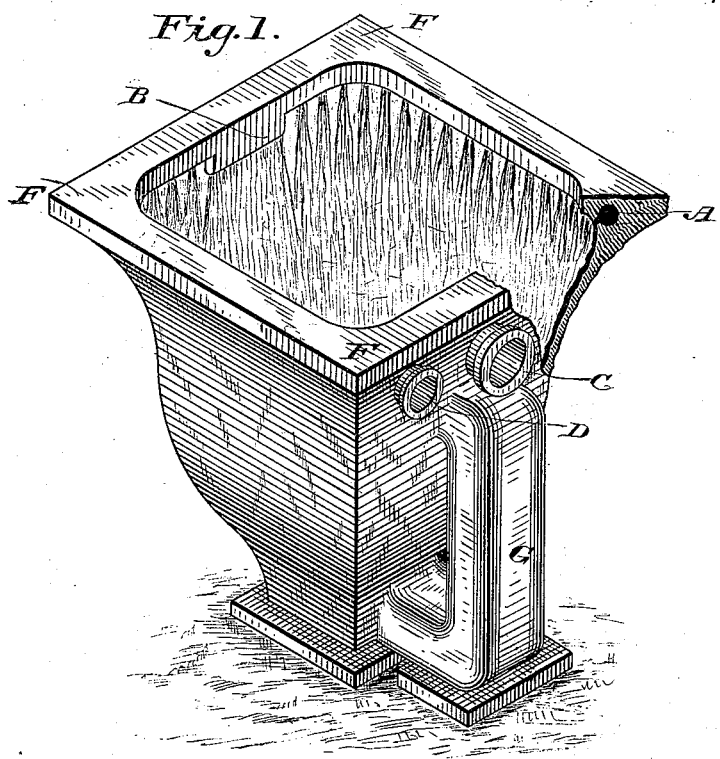
Figure 2:
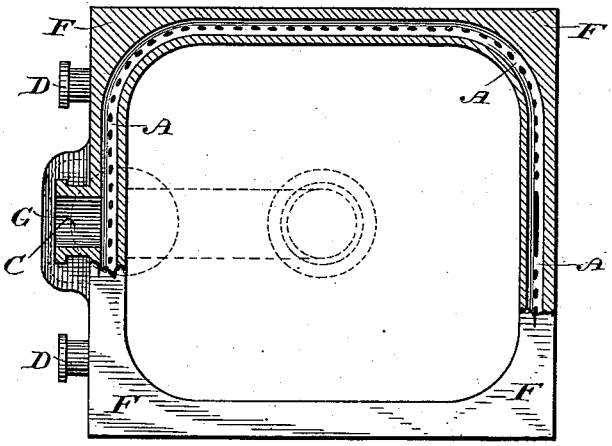

Figure 1 is a perspective view of the closet with part of the back side of the bowl removed, so as to expose a sectional view of the wall of the bowl at the corner and show the graduated thickness of the corner walls. Fig. 2 is a plan view of the bowl, the upper part showing a section through the water tube or channel, and the lower part showing the top of the bowl or closet as finished.

In the drawings like letters refer to like parts.

A is the tube or channel through which passes the water which washes the bowl.

B is a lip which helps to spread over the inner surface of the bowl, the water which passes through the slot in the channel behind the lip B indicated by a short right line in Fig. 2. The dots in the channel A around the sides of the bowl indicate perforations, through which the water streams down the sides of the bowl.

C is the supply-pipe, through which the water enters the channel A.

D D are ventilating-pipes.

F F F F are solid corners or brackets swelling out from the rounded bowl, and G is the outlet or trap pipe.

In making single-piece porcelain washout water-closets it is a desideratum to make the inside of the bowl in a circular or oval form, so that the rush of the water around the inside of the bowl shall not be hindered, but promoted, in order to the proper cleansing of the bowl. It is also requisite, for convenience in setting up and plumbing, that the top of the bowl should be square or oblong in its outline. It is impossible to fit a square top to a round or oval bowl and bake them in one piece without corner-brackets, as the ware will warp and crack. Heretofore such closets have been made with double walls at the corners, giving a square shape outside and a round shape inside, and leaving a hollow space between; but the making of double walls at the corners is expensive and very troublesome, and the ware is uncertain and unsymmetrical and liable to break.

Our improvement consists in a one-piece water-closet, with a bowl rounded on the inside and squared at the outside corners, and having the corner walls single and solid, and so re-enforced that they will not warp nor crack in baking, thus saving considerable expense in their manufacture and making a more symmetrical and serviceable article. The channel A conducts the water around the top of the bowl, and it passes through the perforations shown by the dots in the channel in Fig. 2, and through the slot shown by the right line behind the lip B. It washes through the bottom of the bowl and passes into the trap-pipe G, and thence forward and under the bowl into the soil-pipe. At and near the upper corners of the bowl the wall is re-enforced and curved outwardly at the top, so as to conform to the square-cornered top, and thus gives the top support, and prevents warping and cracking in baking.

What we claim is—

An improved one-piece porcelain washout water-closet bowl having a single solid wall, rounded on the inside and squared on the outside at the top, and having the walls re-enforced and graduated at the top corners, substantially as described.

ALFRED FOWKES.
THOMAS CONNOLLY.

Witnesses:
S. D. OLIPHANT, Jr.,
L. L. HOWELL.